Patented June 19, 1951

2,557,715

UNITED STATES PATENT OFFICE 2,557,715

PROCESS OF MAKING TEST STRIPS AND PRODUCT THEREOF

Arthur Wright, Forest Hills, N. Y.

No Drawing. Application November 13, 1948, Serial No. 59,967

2 Claims. (Cl. 23—253)

My invention relates especially to a method of producing improved testing strips for determining the presence and amount of sugars in liquids as well as to the product thus obtained.

This invention is an improvement upon my previous patent, No. 2,092,566, upon a Tester, granted September 7, 1937, and No. 2,123,690, upon Process and Apparatus for Testing for Sugar, granted July 12, 1938.

The heat resisting testing strips for determining the presence and amount of sugar in liquids in the aforesaid patents have proven to be very effective for the detection of the presence of sugar and for ascertaining the amount thereof. However, due to the fragility of the testing area in the testing strips, they required a considerable amount of care in handling, both before and after the testing therewith as well as in the packaging thereof.

Accordingly, the present invention is designed to avoid the said disadvantage present therein.

An object of my invention is to make the testing strips even more sensitive to the presence of sugar, although the previous test strips, though somewhat fragile, were capable of indicating the presence of as small percentages of sugar as with other testing methods currently in use.

Thus, an object of my invention is not only to provide a testing means, by which the amount of sugar present can be readily tested in merely a few drops of the liquid and in only a few moments of time, merely with the aid of an ordinary match for each test, but by means of a testing strip having a strong area sensitive to the sugar, which is not subject to being broken or damaged with the ordinary care of handling before and after its use. Also, these test strips provide a means of testing showing as good, or even better, indications of the amounts of the sugar than previous testing methods generally used in practice, which is simple and quick.

Furthermore, a valuable advantage in these testing strips over other types of testing, is that each test, when made, forms a permanent record of the result of the test, which can, if desired, be identified and characterized by notations made on the strip, if desired, as a permanent record thereof. Also, the layman can make the test in privacy.

These strips, therefore, have very decided advantages of the previous testing materials in the form of liquids that have been used generally.

Further objects of my invention will be apparent from the detailed description thereof hereinafter.

While my invention is capable of embodiment in many different forms, for the purpose of illustration I have shown only certain embodiments thereof hereinafter.

For example, in carrying out my invention, I may provide a strip or sheet of asbestos paper, preferably about .008 or, instead, .006 inch in thickness, about 1 inch wide and about 3 inches long, and which may be comprised of long-fiber asbestos made with an adhesive of any desired character but usually a burnable binder such as a starch paste amounting to about 2% by weight of the entire composition and which, when dried, provides a coherent strong asbestos paper. This strip is then clamped between two flat metal plates or leaves with holes therein, although one of the holes could be omitted, as in said patents aforesaid, of the same size and shape but having inner beveled faces, in registry with each other, the plates or leaves being, preferably, connected together but relatively movable so as to cover the end of the asbestos strip while the area therein is being incinerated. Before or after being so clamped the strip, or the part opposite the said holes, is made wet with a solution, as for instance a water or alcohol or glycerine solution, of any bismuth salt, as for example bismuth subnitrate, $BiONO_3.H_2O$, kept in solution in water in any desired way, as for instance by the presence of any mineral acid, as a little nitric acid, $HNO_3$, preferably an amount of 38° Bé. nitric acid slightly more than the volume of water present. However, preferably I wet the paper with a solution made by dissolving 8 grams of Rochelle salt (sodium potassium tartrate,

$(CHOH)_2COOK.COONa.4H_2O)$ in 100 cc. of a 20% by weight solution of sodium hydroxide, which is warmed and to which is then added 4 grams of bismuth subnitrate until dissolved. The solution can be filtered, if desired. The Rochelle salt increases the solubility of the bismuth subnitrate and the sodium hydroxide aids in the reduction of the yellow $Bi_2O_3$ to black BiO by the glucose, or other sugar, when present. Instead of the above salts of bismuth I may use any other bismuth salt in any liquid in which it dissolves even though only very slightly soluble therein, as for instance bismuth nitrate, $Bi(NO_3)_3$, or bismuth chloride, $BiCl_3$, or bismuth lactate, $C_6H_9O_6Bi.7H_2O$, or, if desired, bismuth subsalicylate, $C_6H_4(OH)COO.BiO$, or bismuth ammonium citrate. The above may be used with or without the presence of the alkali metal hydroxide, and can be dissolved in any suitable liquid, as for example water, but preferably in the form of a saturated solution or nearly saturated. Or, the bismuth oxide, $Bi_2O_3$, itself can be applied, suspended in water, to the strip.

The sheet or strip of asbestos paper so clamped between the described metal plates, is then heated in any desired way, electrically or otherwise, through either of the holes in the same, as for instance by an oxidizing flame, the tip of a Bunsen burner flame or a blow pipe flame until all the starch is burned out in the areas of said holes and the bismuth compound is changed to $Bi_2O_3$, the metal plates serving to effectively protect the strip from burning except at the said holes. The heating is preferably to a high temperature but not enough to melt the $Bi_2O_3$. In the area heated, the remaining asbestos appears white with a very black ring around the heated area, due to the bismuth, charred starch, etc.

Preferably, there is now applied to the incinerated area of the strip while in the said metal plates, although this can be done after the strip has been removed from the metal plates, one or more drops of a solution or suspension of an inert strengthening mineral salt or compound to obviate or lessen the fragility or increase the thickness of the incinerated area without lessening or preventing the effectiveness of the testing area in showing the sugar present in the liquid to be tested. Such a strengthening material may, for example, be a cold or warm solution of sodium aluminate, $Na_2Al_2O_4$, or sodium silicate, $Na_2Si_4O_9$ or $NaSiO_3.9H_2O$, dissolved in water in any desired proportions, according to the amount of strengthening or thickening of the area desired, but, for example, 1 part by weight of the sodium aluminate or sodium silicate to 25 parts by weight of distilled water. Or, instead, the inert mineral salt or compound may be a homogeneous water suspension of silica gel in any desired proportions, or there may be used for this purpose a homogeneous mixture or solution of gelatinous aluminum hydroxide in water in any desired proportions, as for example 1 part by weight of the aluminum hydroxide in 25 parts by weight of water. The strengthening material is then allowed to dry on the strip. However, I prefer to use the sodium aluminate solution as it is not only very soluble in water, especially when warm, but it is amorphous, making it really absorptive to the liquid to be tested, such as urine. The added strengthening material also makes the testing strip more sensitive to the smaller percentages of the sugar as the thickened testing area will retain a larger amount of the liquid to be tested so as to show the presence of sugar more readily than would otherwise be the case.

The clamped plates are then removed from the testing strip, if this has not already been done, and the prepared dry strip is now ready for the making of the test.

Then the liquid to be tested for the glucose or other sugar, before or after filtering to remove solids, is applied to the prepared strip either by putting a few drops of the liquid on the area that has been heated and which is defined by the black line, or, preferably, the entire end of the strip, containing the said area, is dipped into the liquid. The end of the strip, either while still wet or after being dried, adjacent the area, is then heated on the outside of an oxidizing flame, for instance either a Bunsen burner flame or even by the flame from a single lighted match held under the end of the said area of the strip. The part of the strip outside of the said area that is heated will turn black due to the charring of the starch but the heated portion within the said area will remain white if there was no glucose, or other sugar, present, whereas if present the heated area will become blackened by the formation of black BiO, or metallic bismuth, due to the reduction of the bismuth compound present, $Bi_2O_3$, by the sugar. The amount of this blackening will indicate the amount of the sugar present. For instance, if 5% is present in the liquid the area will become very black, but if only ½% is present it will become greyish-black, and very much less will still give a grey or brown reaction. Preferably the end of the strip is heated only until the strip outside the testing area is blackened half way up said area, and the amount of the sugar present will be observed by the darkened heated portion of the area compared with the unheated portion of the said area. Also, the underside of the heated surface will show a darker reaction when heated in the flame of a Bunsen or similar burner, than the upper surface. Further heating of the heated area in the outside flame of the Bunsen burner will restore the area to a white appearance again, if desired, probably due to the formation of yellow $Bi_2O_3$, which can then be used in the same way over again for testing for glucose or other sugar.

Many changes may be made in the above procedure and compositions, if desired.

In all of the above the uncharred area outside of the incinerated area acts as a convenient flexible non-fragile holding portion when testing the liquid. Also, the strengthened and thickened testing area is strong and resistant to breakage before and after testing and even when being packaged and transmitted for shipping. Besides, the charring of the outside area to an intense black provides a sharp contrast to the testing area, which is an aid to the eye in testing.

While I have described my invention above in detail I wish it to be understood that many changes may be made therein without departing from the spirit of the same.

I claim:

1. The process which comprises strengthening a fragile sheet of asbestos, said sheet constituting a testing area, freed from organic matter, said area carrying a light colored bismuth oxide capable of being reduced to a dark bismuth compound by an aqueous sugar solution in the presence of heat, which includes adding to said area sodium aluminate carried by a liquid forming a solution with said sodium aluminate and allowing the liquid to evaporate.

2. A sheet of asbestos having a fragile sugar testing area, free of organic matter, carrying a light colored bismuth oxide strengthened and thickened by absorbent sodium aluminate.

ARTHUR WRIGHT.

REFERENCES CITED

The following references are of record in the file of this patent:

UNITED STATES PATENTS

| Number | Name | Date |
| --- | --- | --- |
| 1,857,496 | Clapp | May 10, 1932 |
| 2,092,566 | Wright | Sept. 7, 1937 |
| 2,123,690 | Wright | July 12, 1938 |
| 2,451,805 | Callinan | Oct. 19, 1948 |
| 2,460,734 | Callinan | Feb. 1, 1949 |
| 2,467,540 | Smith et al. | Apr. 19, 1949 |

OTHER REFERENCES

Gregory: Uses and Applications of Chemicals and Related Materials, vol. II, page 298, Reinhold Publ. Corp., New York, N. Y., 1944.